(12) United States Patent
Hwang et al.

(10) Patent No.: US 12,471,137 B2
(45) Date of Patent: Nov. 11, 2025

(54) METHOD AND APPARATUS FOR STR IN WIRELESS LAN THAT SUPPORTS MULTI-LINKS

(71) Applicants: ELECTRONICS AND TELECOMMUNICATIONS RESEARCH INSTITUTE, Daejeon (KR); KOREA NATIONAL UNIVERSITY OF TRANSPORTATION INDUSTRY—ACADEMIC COOPERATION FOUNDATION, Chungju-si (KR)

(72) Inventors: Sung Hyun Hwang, Daejeon (KR); Kyu Min Kang, Daejeon (KR); Jae Cheol Park, Daejeon (KR); Jin Hyung Oh, Sejong (KR); Dong Woo Lim, Daejeon (KR); Su Na Choi, Daejeon (KR); Yong Ho Kim, Incheon (KR); Han Seul Hong, Seoul (KR)

(73) Assignees: Electronics and Telecommunications Research Institute, Daejeon (KR); Korea National University of Transportation Industry Academic Cooperation Foundation, Chungju-si (KR)

( * ) Notice: Subject to any disclaimer, the term of this patent is extended or adjusted under 35 U.S.C. 154(b) by 451 days.

(21) Appl. No.: 17/792,692

(22) PCT Filed: Jan. 6, 2021

(86) PCT No.: PCT/KR2021/000142
§ 371 (c)(1),
(2) Date: Jul. 13, 2022

(87) PCT Pub. No.: WO2021/145601
PCT Pub. Date: Jul. 22, 2021

(65) Prior Publication Data
US 2023/0040910 A1 Feb. 9, 2023

(30) Foreign Application Priority Data

Jan. 14, 2020 (KR) .................. 10-2020-0004841
Mar. 30, 2020 (KR) .................. 10-2020-0038437

(51) Int. Cl.
H04W 74/0808 (2024.01)
(52) U.S. Cl.
CPC .............................. H04W 74/0808 (2013.01)
(58) Field of Classification Search
CPC ............................................... H04W 74/0808
See application file for complete search history.

(56) References Cited

U.S. PATENT DOCUMENTS 8,411,698 B2 4/2013 Lee et al.
8,842,624 B2 9/2014 Trachewsky
(Continued)

FOREIGN PATENT DOCUMENTS

KR 1020190136067 A 12/2019
KR 1020190141634 A 12/2019
(Continued)

OTHER PUBLICATIONS

Zhou, Yifan et al. Simultaneous Tx/Rx Capability indication for multi-link operation. Doc.: IEEE 802.11-19/1550r1. Nov. 25, 2019.
(Continued)

Primary Examiner — Benjamin H Elliott, IV
Assistant Examiner — Nevena Zecevic Sandhu
(74) Attorney, Agent, or Firm — Rabin & Berdo, P.C.

(57) ABSTRACT

A method and an apparatus for STR in a wireless LAN that supports multi-links are disclosed. An operating method of a first communication node comprises the steps of: trans-
(Continued)

mitting a first frame to a second communication node through a first link from among multi-links; receiving, from the second communication node, a response frame for the first frame through the first link; checking a channel occupancy time in a second link from among the multi-links on the basis of first information included in the response frame; and performing a sensing operation in a preset section after the end of the channel occupancy time in the second link.

18 Claims, 15 Drawing Sheets

(56) References Cited

U.S. PATENT DOCUMENTS

| | | | |
|---|---|---|---|
| 9,025,544 B2 | 5/2015 | Kim et al. | |
| 9,622,218 B2 | 4/2017 | Lee et al. | |
| 10,278,210 B2 | 4/2019 | Ahn et al. | |
| 2008/0002615 A1* | 1/2008 | Nakajima | H04W 74/0816 370/328 |
| 2012/0134292 A1* | 5/2012 | Pandharipande | H04W 74/0816 370/252 |
| 2012/0243494 A1 | 9/2012 | Trachewsky | |
| 2017/0150524 A1* | 5/2017 | Oh | H04W 74/0808 |
| 2017/0202026 A1 | 7/2017 | Ahn et al. | |
| 2018/0077723 A1* | 3/2018 | Adachi | H04L 27/2602 |
| 2018/0235004 A1 | 8/2018 | Cheong et al. | |
| 2019/0075549 A1* | 3/2019 | Yucek | H04W 72/02 |
| 2019/0124657 A1 | 4/2019 | Kim et al. | |
| 2019/0357240 A1 | 11/2019 | Kim et al. | |
| 2020/0015165 A1 | 1/2020 | Hwang et al. | |

FOREIGN PATENT DOCUMENTS

| | | |
|---|---|---|
| WO | 2020055016 A1 | 3/2020 |
| WO | 2020060145 A1 | 3/2020 |

OTHER PUBLICATIONS

Sharan Naribole et al., "Multi-link Channel Access Discussion", Samsung, IEEE 802.11-19/1405r5, Oct. 31, 2019.
Sharan Naribole et al., "Multi-link Channel Access Discussion", Samsung, IEEE 802-11-19-1405-1 Sep. 15, 2019.

* cited by examiner

METHOD AND APPARATUS FOR STR IN WIRELESS LAN THAT SUPPORTS MULTI-LINKS

TECHNICAL FIELD

The present disclosure relates to a communication technique in a wireless LAN, and more specifically, to a communication technique for simultaneous transmit and receive (STR) in a wireless LAN supporting multi-links.

BACKGROUND ART

Recently, as the spread of mobile devices expands, a wireless local area network (LAN) technology capable of providing fast wireless communication services to mobile devices is in the spotlight. The wireless LAN technology may be a technology that supports mobile devices (e.g., smart phones, smart pads, laptop computers, portable multimedia players, embedded devices, etc.) to wirelessly access the Internet based on wireless communication technology.

The wireless LAN technology is being standardized in the Institute of Electrical and Electronics Engineers (IEEE) 802.11. The initial version of the IEEE 802.11 standard can support a communication speed of 1 to 2 megabits per second (Mbps). Thereafter, the standardization proceeded in the direction of improving the initial version. The IEEE 802.11a standard can support a communication speed of up to 54 Mbps using Orthogonal Frequency Division Multiplexing (OFDM) technology in a 5 GHz band. The IEEE 802.11b standard can support a communication speed of up to 11 Mbps using Direct Sequence Spread Spectrum (DSSS) technology in a 2.4 GHz band.

Due to the demand for improved communication speeds, the IEEE 802.11n standard was developed to support High Throughput (HT). The OFDM technology can be supported in the IEEE 802.11n standard, and operating bands of the IEEE 802.11n may be the 2.4 GHz band and the 5 GHz band. The IEEE 802.11n standard can provide an improved maximum communication speed by using a channel bandwidth extension technique and a multiple input multiple output (MIMO) technique. When four spatial streams and a 40 MHz bandwidth are used in the IEEE 802.11n standard, the maximum communication speed may be 600 Mbps.

As applications utilizing the above-described wireless LAN technologies are diversified, a demand for a wireless LAN technology supporting a higher throughput has arisen. Accordingly, in the IEEE 802.11ac standard supporting Very High Throughput (VHT), a used bandwidth (e.g., up to 160 MHz or 80+80 MHz) has been extended, and the number of supportable spatial streams has increased. The IEEE 802.11ac standard can provide a communication speed of 1 giga bits per second (Gbps) or more. It is possible to support downlink communication for a plurality of stations by using the MIMO technique in the IEEE 802.11ac standard.

As the demand for wireless LAN technologies further increases, the IEEE 802.11ax standard was developed to increase a spectral efficiency in a dense environment. The IEEE 802.11ax standard may support multi-user (MU) Orthogonal Frequency Division Multiple Access (OFDMA) technology, and uplink communication may be performed using the MU MIMO/OFDMA technology.

As applications requiring higher throughput and applications requiring real-time transmissions occur, the IEEE 802.11be standard has been developed to support Extreme High Throughput (EHT). In the IEEE 802.11be standard, a target communication speed may be 30 Gbps, and operations for reducing a frame transmission latency may be supported. In addition, the IEEE 802.11be standard may support an extended bandwidth (e.g., 320 MHz bandwidth), multi-link operations using multi-bands, aggregation operations, transmission operations of a multi-access point (AP), efficient retransmission operations (e.g., hybrid automatic repeat request (HARQ) operation), and the like.

However, it is necessary to define detailed operations for the multi-link operations. In particular, when bands (e.g., links, channels) in which the multi-link operations are performed are adjacent, simultaneous transmit and receive (STR) operations using the multi-links may not be performed due to interferences between the adjacent bands.

Meanwhile, the prior arts of the present disclosure have been described to enhance understanding of the background of the present disclosure, and may include contents other than the prior arts already known to ordinary skilled persons in the field to which the present disclosure belongs.

DISCLOSURE

Technical Problem

An objective of the present disclosure for solving the above-described problem is directed to providing a method and an apparatus for supporting simultaneous transmit and receive (STR) in a wireless LAN system supporting multi-links.

Technical Solution

An operation method of a first device according to a first exemplary embodiment of the present disclosure for achieving the objective may comprise transmitting a first frame using a first link among the multi-links; identifying a channel state in a second link among the multi-links when the transmission of the first frame ends; and performing a carrier sensing operation in a first time period according to a first timer when the channel state in the second link is an idle state, wherein a transmission operation in the first link and a reception operation in the second link are not simultaneously performed.

A transmission end time point of the first frame may be identified by a value of a duration field included in a header of the first frame.

A virtual carrier sensing operation in the second link may not be performed while transmitting the first frame.

The operation method may further comprise, when the channel state in the second link is a busy state, performing the carrier sensing operation in a second time period according to a second timer after the busy state ends.

Each of the first time period and the second time period may be longer than a short interframe space (SIFS), a point coordination function (PCF) interframe space (PIFS), a distributed interframe space (DIFS), or an arbitration interframe space (AIFS).

The operation method may further comprise receiving, from a second device, a second frame including transmission time point information through one of the multi-links, wherein the transmission time point information indicates a time point at which transmission in the link 2 is possible.

The operation method may further comprise transmitting a third frame using the second link at the time point indicated by the transmission time point information.

A first device according to a first exemplary embodiment of the present disclosure for achieving the objective may comprise a processor; a first node performing communication in a first link among the multi-links under control of the processor; a second node performing communication in a second link among the multi-links under control of the processor; a memory electronically communicating with the processor; and instructions stored in the memory, wherein when executed by the processor, the instructions cause the first device to: transmit a first frame using a first link among the multi-links; identify a channel state in a second link among the multi-links when the transmission of the first frame ends; and perform a carrier sensing operation in a first time period according to a first timer when the channel state in the second link is an idle state, wherein a transmission operation in the first link and a reception operation in the second link are not simultaneously performed.

A transmission end time point of the first frame may be identified by a value of a duration field included in a header of the first frame.

A virtual carrier sensing operation in the second link may not be performed while transmitting the first frame.

The instructions may further cause the first device to, when the channel state in the second link is a busy state, perform the carrier sensing operation in a second time period according to a second timer after the busy state ends.

Each of the first time period and the second time period may be longer than a short interframe space (SIFS), a point coordination function (PCF) interframe space (PIFS), a distributed interframe space (DIFS), or an arbitration interframe space (AIFS).

The instructions may further cause the first device to receive, from a second device, a second frame including transmission time point information through one of the multi-links, wherein the transmission time point information indicates a time point at which transmission in the link 2 is possible.

The instructions may further cause the first device to transmit a third frame using the second link at the time point indicated by the transmission time point information.

Advantageous Effects

When the links (e.g., bands, channels) are adjacent to each other in the WLAN system supporting multi-links, simultaneous transmit and receive (STR) operations may not be performed due to interferences. For example, while a transmission operation is performed in a link 1, a virtual sensing operation based on a preamble and/or an operation for setting a network allocation vector (NAV) based on a duration field included in a frame may not be performed in a link 2 adjacent to the link 1.

In order to solve the above-described problem, a station may perform a channel access operation after an Extended InterFrame Space (EIFS) from an end time point of a busy state in the link 2. Alternatively, the station may receive information on a channel usage time (e.g., band usage time, link usage time) of the link 2 from an access point or another station in the link 1. In this case, the station may perform a channel access operation in the link 2 after an Arbitration InterFrame Space (AIFS) from an end time point of the channel usage time.

Accordingly, fairness for transmission operations using an existing link can be maintained in the WLAN supporting multi-links, and time inefficiency for the channel access operation for the multi-link operations can be minimized. Therefore, communication performance can be improved in the WLAN system. The exemplary embodiments according to the present disclosure may be applied to various communication systems (e.g., WLAN systems, cellular communication systems).

MODES OF THE INVENTION

Figure 1:
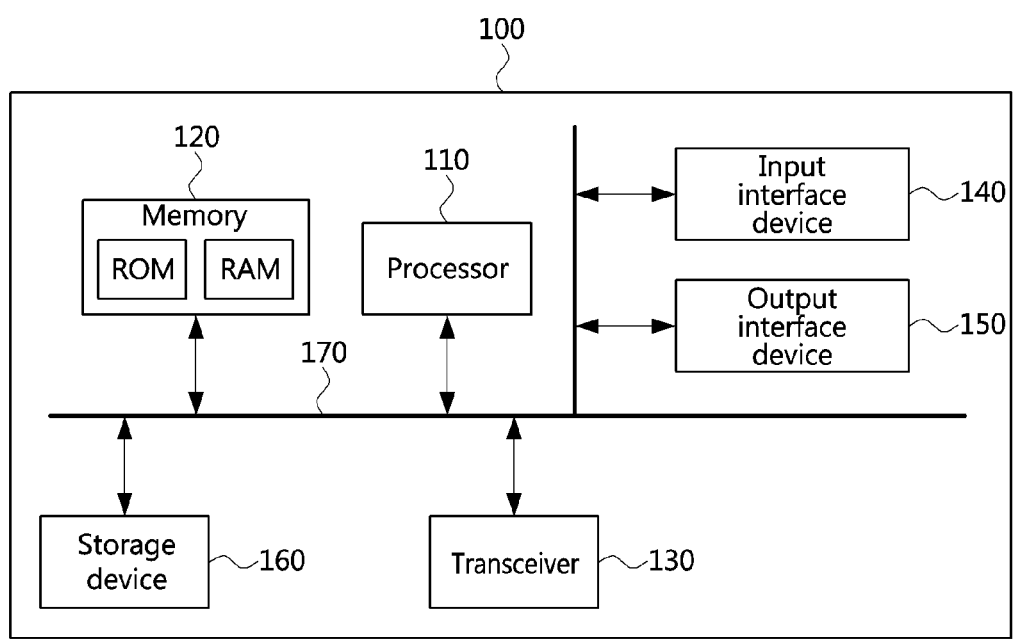
FIG. 1 is a block diagram illustrating a first exemplary embodiment of a communication node constituting a wireless LAN system.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a block diagram illustrating a first exemplary embodiment of a communication node constituting a wireless LAN system.

Referring to FIG. 1, a communication node 100 may be an access point, a station, an access point (AP) multi-link device (MLD), or a non-AP MLD. The access point may refer to an AP, and the station may refer to a STA or a non-AP STA. The operating channel width supported by the access point may be 20 megahertz (MHz), 80 MHz, 160 MHz, or the like. The operating channel width supported by the station may be 20 MHz, 80 MHz, or the like.

The communication node 100 may include at least one processor 110, a memory 120, and a transceiver 130 connected to a network to perform communications. The transceiver 130 may be referred to as a transceiving device, a radio frequency (RF) unit, an RF module, or the like. In addition, the communication node 100 may further include an input interface device 140, an output interface device 150, a storage device 160, and the like. The components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute at least one instruction stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
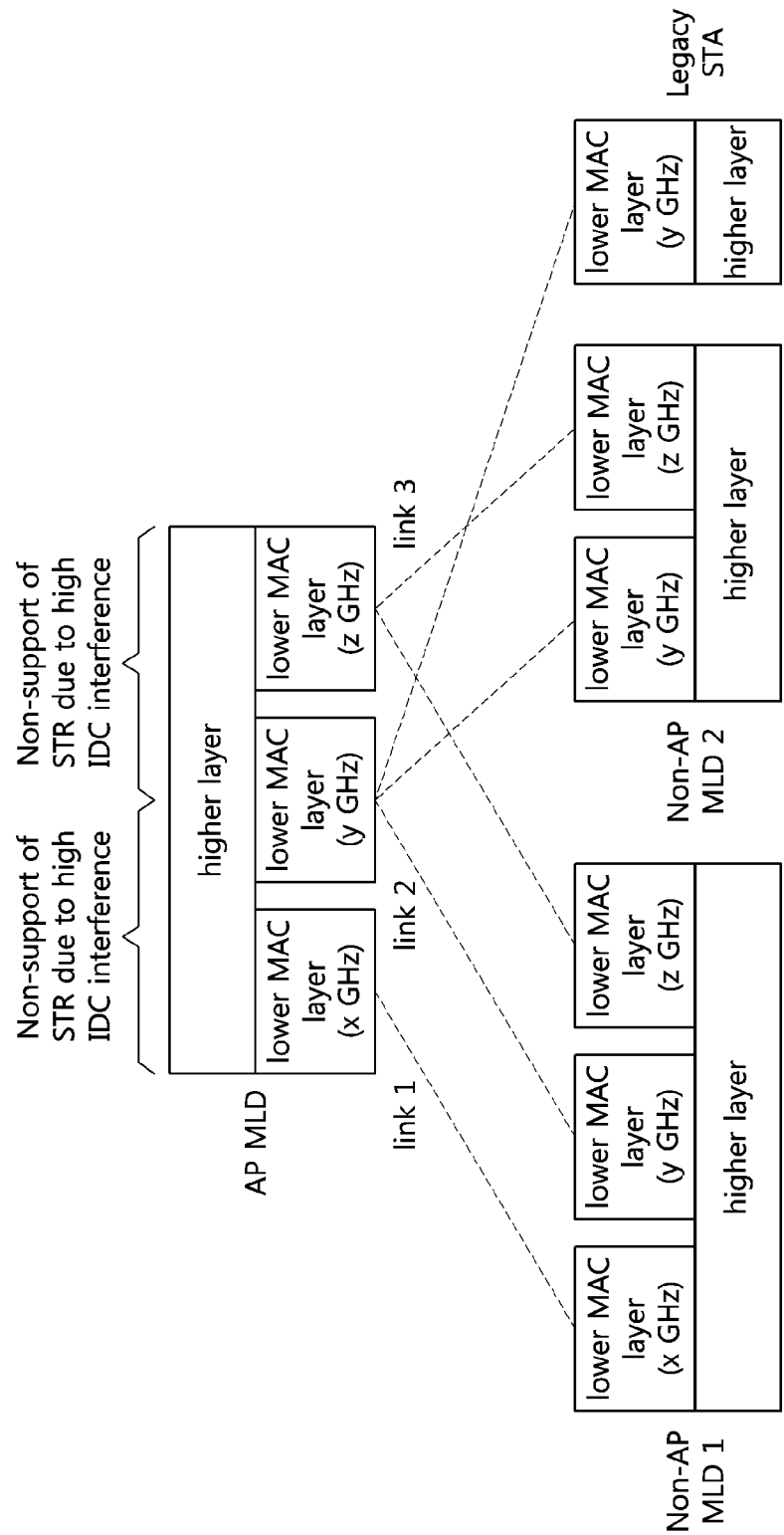
FIG. 2 is a conceptual diagram illustrating a first exemplary embodiment of multi-links configured between MLDs.

FIG. 2 is a conceptual diagram illustrating a first exemplary embodiment of multi-links configured between MLDs.

Referring to FIG. 2, a MLD may have one medium access control (MAC) address. In exemplary embodiments, the MLD may refer to an AP MLD and/or a non-AP MLD. The MAC addresses of the MLDs may be used in a multi-link setup procedure between the non-AP MLD and the AP MLD. The MAC address of the AP MLD may be different from the MAC address of the non-AP MLD. Access point(s) affiliated with the AP MLD may have different MAC addresses, and station(s) affiliated with the non-AP MLD may have different MAC addresses. Each of the access points within the AP MLD having different MAC addresses may be responsible for each link and may function as an independent AP. Similarly, each of the stations within the non-AP MLD having different MAC addresses may be responsible for each link and may function as an independent STA. The non-AP MLD may also be referred to as a STA MLD. The MLD may support simultaneous transmit and receive (STR) operations. In this case, the MLD may perform a transmission operation in a link 1 and a reception operation in a link 2. The MLD supporting STR operations may be referred to as a STR MLD (e.g., STR AP MLD, STR non-AP MLD). In exemplary embodiments, a link may refer to a channel or a band. A device that does not support STR operations may be referred to as a non-STR (NSTR) AP MLD or a NSTR non-AP MLD (or NSTR STA MLD).

The MLD may transmit and receive frames in multi-links by using a non-continuous bandwidth extension scheme (e.g., 80 MHz+80 MHz). The multi-link operation may include multi-band transmission. The AP MLD may include a plurality of APs, and the plurality of APs may operate in different links. The non-AP MLD may include a plurality of stations, and the plurality of stations may operate in different links.

The MLD may perform communication in multi-bands. For example, the MLD may perform communication using an 80 MHz bandwidth according to a channel extension scheme (e.g., bandwidth extension scheme) in a 2.4 GHz band, and perform communication using a 160 MHz bandwidth according to a channel extension scheme in a 5 GHz band. The MLD may perform communication using a 160 MHz bandwidth in the 5 GHz band and a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band.

The MLD (e.g., AP MLD and/or non-AP MLD) may configure multi-links by performing an access procedure and/or a negotiation procedure for the multi-link operations. In this case, the number of links and/or links to be used among the multi-links may be configured. The non-AP MLD (e.g., station) may identify information on a band capable of communicating with the AP MLD. In the negotiation procedure for the multi-link operations between the non-AP MLD and the AP MLD, the non-AP MLD may be configured to use one or more links among the links supported by the AP MLD for the multi-link operations. A station that does not support the multi-link operations (e.g., IEEE 802.11a/b/g/n/ac/ax station) may be connected to one or more links among the links supported by the AP MLD.

If a band gap between the multi-links (e.g., a band gap between the link 1 and the link 2 in the frequency domain) is sufficient, the MLD may perform STR operations. For example, the MLD may transmit a physical layer convergence procedure (PLCP) protocol data unit (PPDU) 1 by using the link 1 among the multi-links, and may receive a PPDU 2 by using the link 2 among the multi-links. On the other hand, if the MLD performs STR operations when the band gap between the multi-links is not sufficient, in-device coexistence (IDC) interference, which is interference between the multi-links, may occur. Therefore, if the band gap between the multi-links is insufficient, the MLD may not be able to perform the STR operations. That is, the MLD may be a NSTR AP MLD or a NSTR non-AP MLD.

For example, multi-links including a link 1, a link 2, and a link 3 may be configured between an AP MLD and a non-AP MLD 1. When a band gap between the link 1 and the link 3 is sufficient, the AP MLD may perform STR operations by using the links 1 and 3. That is, the AP MLD may transmit a frame using the link 1 and may receive a frame using the link 3. If a band gap between the link 1 and the link 2 is insufficient, the AP MLD may not be able to perform STR operations by using the links 1 and 2. If a band gap between the link 2 and the link 3 is insufficient, the AP MLD may not be able to perform STR operations by using the link 2 and the link 3.

Meanwhile, a negotiation procedure for multi-link operations may be performed in an access procedure between a station and an access point in a wireless LAN system.

Figure 3:
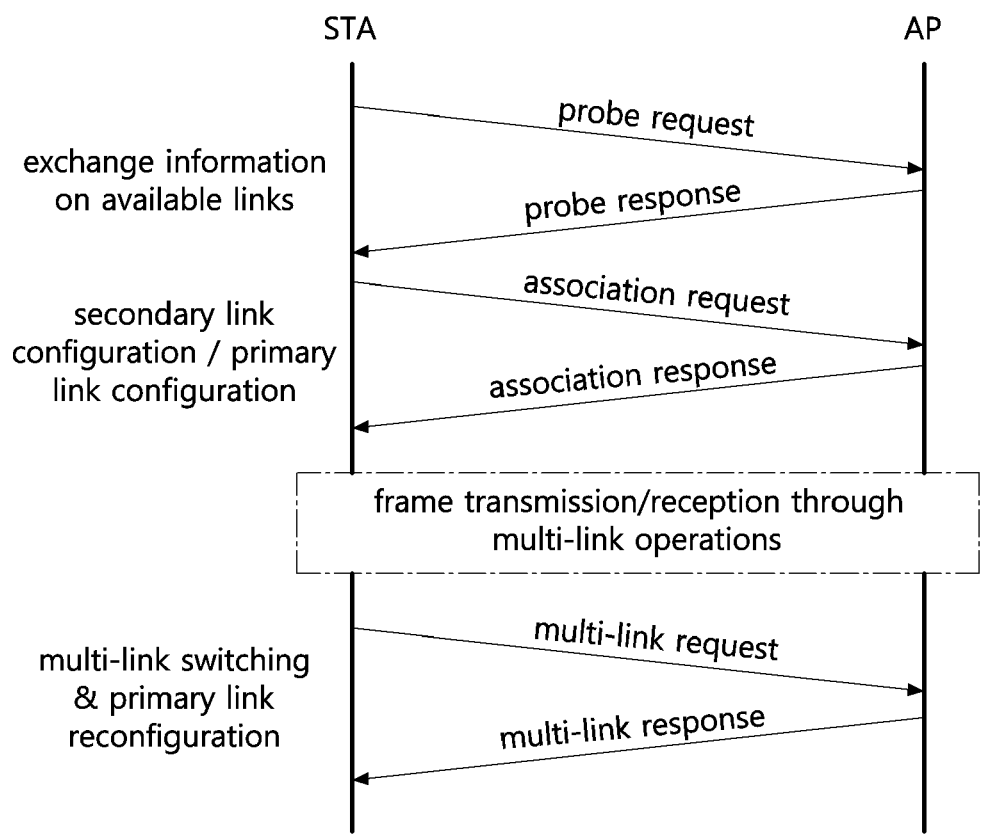
FIG. 3 is a sequence chart illustrating a first exemplary embodiment of a negotiation procedure for multi-link operations in a wireless LAN system.

FIG. 3 is a sequence chart illustrating a first exemplary embodiment of a negotiation procedure for multi-link operations in a wireless LAN system.

Referring to FIG. 3, an access procedure between a station and an access point in an infrastructure basic service set (BSS) may comprise a probe step of detecting an access point, an authentication step between the station and the detected access point, and an association step between the station and the authenticated access point.

In the probe step, the station may detect one or more access points using a passive scanning scheme or an active scanning scheme. When the passive scanning scheme is used, the station may detect one or more access points by overhearing beacon frame(s) transmitted by the one or more access points. When the active scanning scheme is used, the station may transmit a probe request frame, and one or more access points may be detected by receiving probe response frame(s) that are response(s) to the probe request frame from the one or more access points.

When one or more access points are detected, the station may perform the authentication step with the detected access point(s). In this case, the station may perform the authentication step with a plurality of access points. Authentication algorithms according to the IEEE 802.11 specification may be classified into an open system algorithm in which two authentication frames are exchanged, a shared key algorithm in which four authentication frames are exchanged, and the like.

The station may complete the authentication by transmitting an authentication request frame based on the authentication algorithm according to the IEEE 802.11 specification, and receiving an authentication response frame that is a response to the authentication request frame from the access point.

When the authentication with the access point is completed, the station may perform the association step with the access point. In this case, the station may select one of the access point(s) that performed the authentication step with itself, and may perform the association step with the selected access point. That is, the station may transmit an association request frame to the selected access point, and complete the association step with the selected access point by receiving an association response frame that is a response to the association request frame from the selected access point.

Meanwhile, multi-link operations may be supported in the WLAN system. The MLD may include one or more STAs affiliated with the MLD. The MLD may be a logical entity. The MLD may be classified into an AP MLD and anon-AP MLD. Each STA affiliated with the AP MLD may be an AP, and each STA associated with the non-AP MLD may be a non-AP STA. In order to configure multi-links, a multi-link discovery procedure, a multi-link setup procedure, and the like may be performed. The multi-link discovery procedure may be performed in the probe step between the station and the access point. In this case, a multi-link (ML) information element (IE) may be included in the beacon frame, the probe request frame, and/or the probe response frame.

For example, in order to perform the multi-link operations, information indicating whether the multi-link operations can be performed between the access point (e.g., AP affiliated with the MLD) and the station (e.g., non-AP STA affiliated with the MLD) and information on available links may be exchanged in the probe step. In the negotiation procedure (e.g., multi-link setup procedure) for the multi-link operations, the access point and/or the station may transmit information on links to be used for the multi-link operation. The negotiation procedure for the multi-link operations may be performed in the access procedure (e.g., association step) between the station and the access point, and the information element(s) required for the multi-link operation may be configured and changed by an action frame in the negotiation procedure.

Further, in the access procedure (e.g., association step) between the station and the access point, available link(s) of the access point may be configured, and an identifier (ID) may be assigned to each link. Thereafter, in the negotiation procedure and/or change procedure for the multi-link operation, information indicating whether each link is activated may be transmitted, and the information may be expressed using a link ID.

The information indicating whether the multi-link operations can be performed may be transmitted and received in an exchange procedure of capability information elements (e.g., extremely high throughput (EHT) capability information elements) between the station and the access point. The capability information elements may include information on a supporting band(s), information on a supporting link(s) (e.g., IDs and/or number of supporting link(s)), information on links capable of STR operations (e.g., information on bands of the links, information on spacing between the links), and the like. In addition, the capability information element may include information individually indicating a link capable of STR operations.

Figure 4:
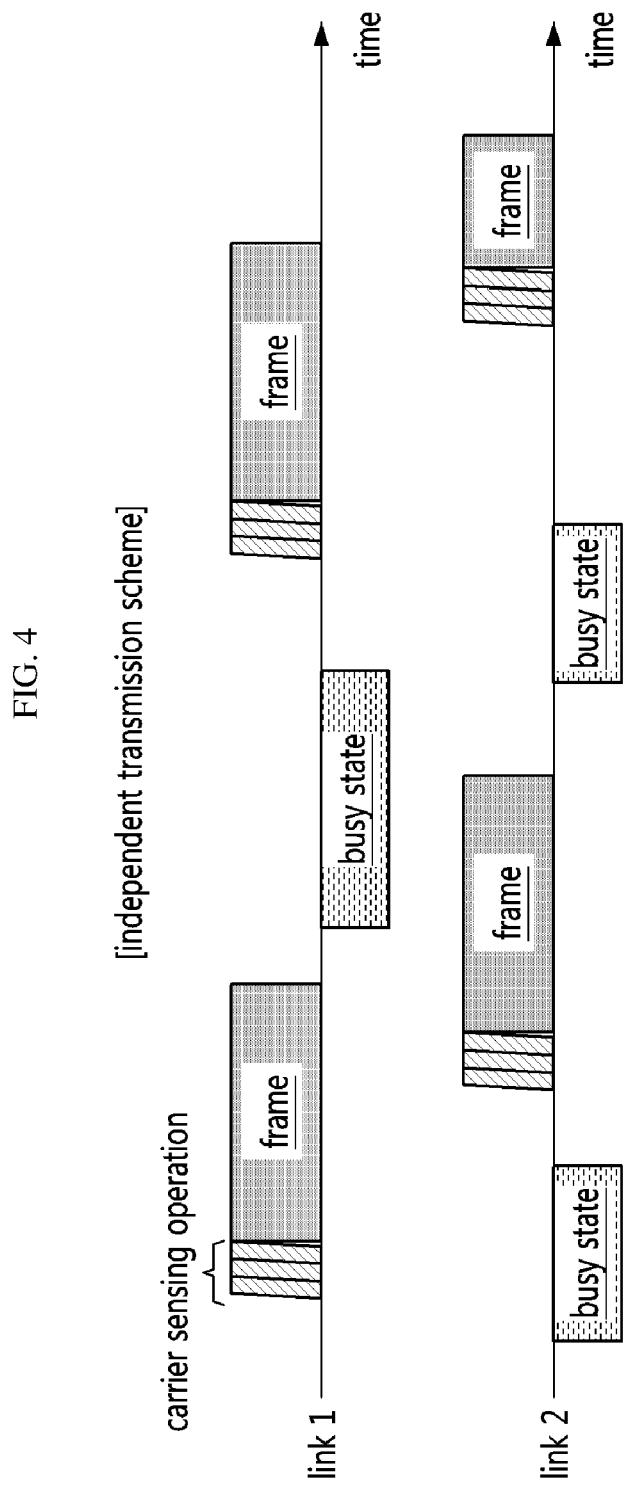
FIG. 4 is a timing diagram illustrating a first exemplary embodiment of a communication method using multi-links in a wireless LAN system.

FIG. 4 is a timing diagram illustrating a first exemplary embodiment of a communication method using multi-links in a wireless LAN system.

Referring to FIG. 4, transmission/reception operations using multi-links (hereinafter referred to as 'multi-link operations') may be independently performed in each of the links (e.g., link 1 and link 2). This operation may be referred to as an 'independent transmission scheme', and STR operations may be performed based on the independent transmission scheme. Here, the link 1 may refer to the link 1 shown in FIG. 2, and the link 2 may refer to the link 2 shown in FIG. 2. The MLD (e.g., AP MLD or STA MLD) may operate in the multi-links, and may include an AP or STA responsible for each link. A STA 1 included in the STA MLD may be responsible for the link 1, and a STA 2 included in the STA MLD may be responsible for the link 2.

The independent transmission scheme may be used when links (e.g., bands or channels used by the links) have a sufficient spacing so as not to interfere with the stations using the multi-links. In exemplary embodiments, the station may refer to an AP, a STA (i.e., non-AP STA), an AP MLD, or a STA MLD (i.e., non-AP MLD). When the independent transmission scheme is used, a lower layer (e.g., a physical (PHY) layer and/or a MAC layer) may individually perform a channel access operation in each link (e.g., link 1 and link 2) to transmit a frame (e.g., PDU) obtained from a higher layer. When a transmission opportunity (TXOP) is secured by the channel access operation, the lower layer may transmit the frame in the corresponding TXOP.

The channel access operation may be a carrier sensing operation performed during an arbitration interframe space (AIFS) according to data (e.g., access category (AC) of the data) included in the frame. The carrier sensing operation may also be referred to as a 'channel sensing operation'. When it is determined that the channel (e.g., link) is in a busy state by the carrier sensing operation or when the transmission of the data frame transmission is complete, the channel access operation may include the carrier sensing operation during the AIFS and a backoff operation.

The carrier sensing operation may be classified into a physical carrier sensing (i.e., PHY layer carrier sensing) operation and a virtual carrier sensing operation. The PHY layer carrier sensing operation may be an energy detection (ED) operation for detecting a received power in an operating channel (e.g., operating link). The virtual carrier sensing operation may include a setting operation based on a value of a length field included in a preamble of a frame (e.g., PPDU or MPDU) received from another station and a network allocation vector (NAV) setting operation based on a value of a duration field included in a MAC header and/or a value of a TXOP field included in a preamble of the frame received from another station. The NAV may be an indicator indicating a transmission time of transmission not initiated by the station setting the NAV, that is, a transmission time of transmission initiated by another station. The transmission time may be independent of a result of the PHY layer channel sensing. The NAV setting operation may be an operation of setting a period (e.g., busy period) in which frame transmission is prohibited by the value of the duration field included in the MAC header of a frame transmitted by a terminal inside and/or outside the basic service set (BSS). When the virtual carrier sensing is successful and the NAV is set, the period corresponding to the NAV may be determined as a busy period without performing actual carrier sensing.

When the independent transmission scheme is used, transmission times of frames in the links (e.g., link 1 and link 2) may not coincide. Since the channel access operation is performed independently in each of the links, the links may be used efficiently.

Figure 5:
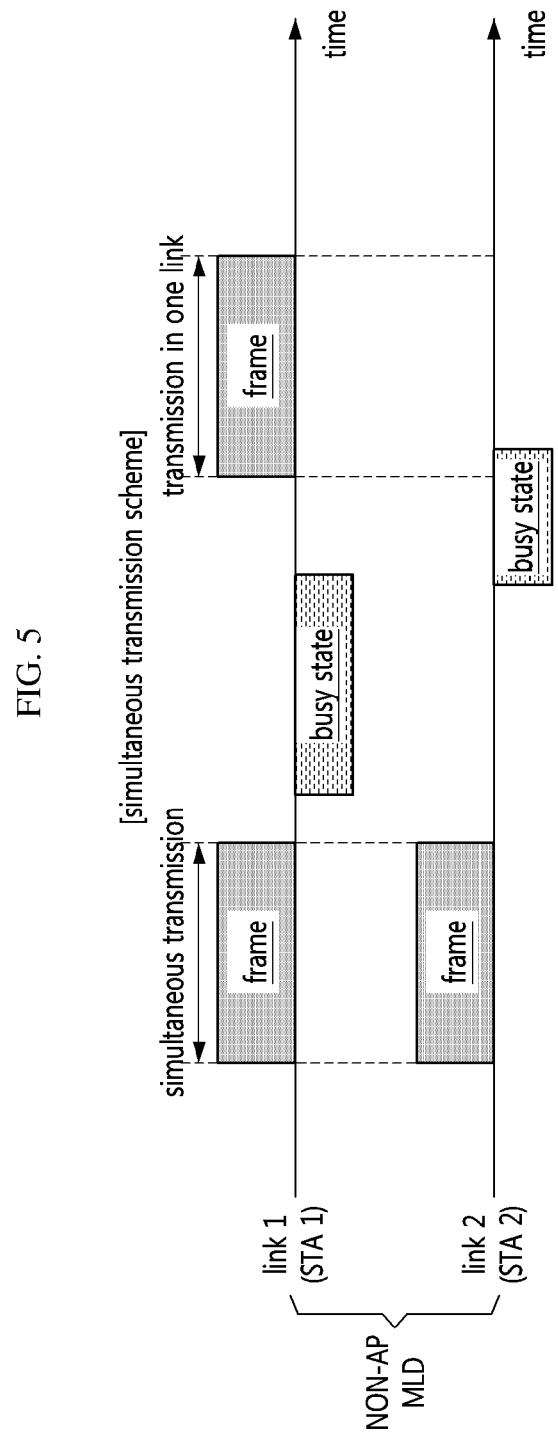
FIG. 5 is a timing diagram illustrating a second exemplary embodiment of a communication method using multi-links in a wireless LAN system.

FIG. 5 is a timing diagram illustrating a second exemplary embodiment of a communication method using multi-links in a wireless LAN system.

Referring to FIG. 5, when a spacing between links (e.g., bands used by the links) is insufficient, interference may occur between the links. When a transmission operation is performed in one link, a reception operation in another link may not be performed due to interference caused by the transmission operation. For example, a station (e.g., MLD) may use two links, and a link 1 and a link 2 may operate in the 5 GHz band. If a spacing between the link 1 and the link 2 is insufficient, when the station performs a transmission operation in the link 1, a reception operation in the link 2 may be impossible. Here, the link 1 may refer to the link 1 shown in FIG. 2, and the link 2 may refer to the link 2 shown in FIG. 2. The MLD (e.g., AP MLD or STA MLD) may operate in multiple links, and may include an AP or STA responsible for each link. A STA 1 included in the STA MLD may be responsible for the link 1, and a STA 2 included in the STA MLD may be responsible for the link 2.

In order to solve the above-described problem, the station may transmit frames in the link 1 and the link 2 simultaneously. This operation may be referred to as a 'simultaneous transmission scheme', and STR operations may be performed based on the simultaneous transmission scheme. When the simultaneous transmission scheme is used, transmission start time points and transmission end time points of the frames transmitted in the links may be set identically. That is, the lengths of the frames simultaneously transmitted in the links may be the same. In order to support the simultaneous transmission scheme, when the lengths of frames to be transmitted in the links are different, padding bits may be added to a specific frame(s) to match the lengths of the frames.

When the simultaneous transmission scheme is used and one (e.g., link 2) of the two links is in a busy state, the station may transmit a frame in the other link (e.g., link 1). Alternatively, the station may perform a channel access operation (e.g., backoff operation).

When the simultaneous transmission scheme is used, a receiving station may receive the frames simultaneously in the multi-links. Therefore, the frame reception operation may be simplified. The frames transmitted according to the simultaneous transmission scheme may include information (e.g., link IDs) on the links used for the simultaneous transmission scheme. The information on the links may be configured as a bitmap. In this case, the bitmap may be included in an EHT signal (SIG) field, and a specific bit included in the bitmap may indicate whether a link associated with the specific bit is used for the simultaneous transmission scheme. The EHT SIG field may be a field defined in the IEEE 802.11be specification, and may be included in a preamble of a frame (e.g., PPDU). Alternatively, an EHT control field included in the frame may indicate information on the links used for the simultaneous transmission scheme.

Figure 6A:
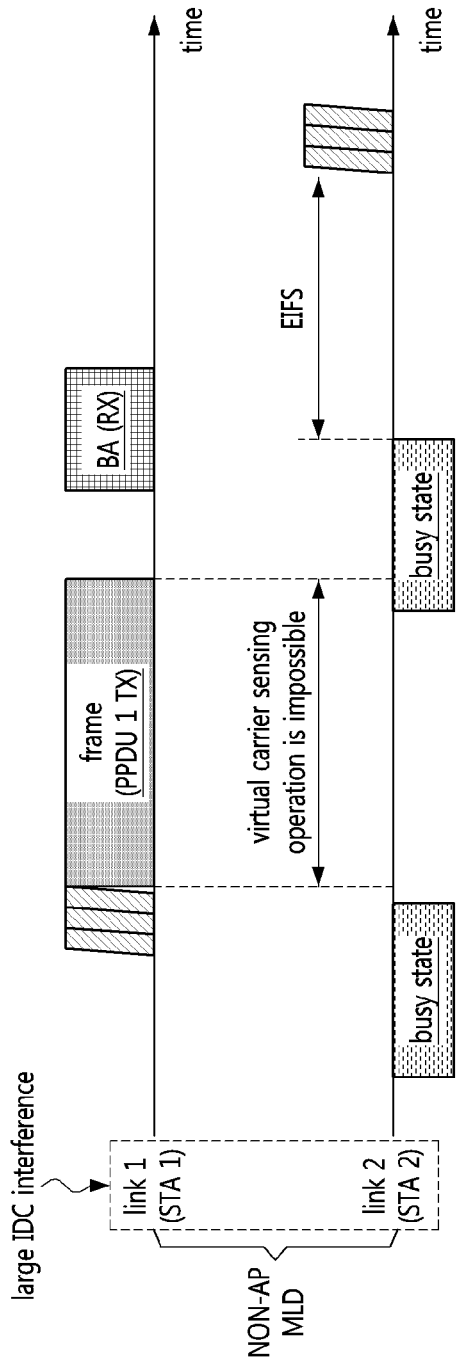
FIG. 6A is a timing diagram illustrating a third exemplary embodiment of a communication method using multi-links in a wireless LAN system.
Figure 6B:
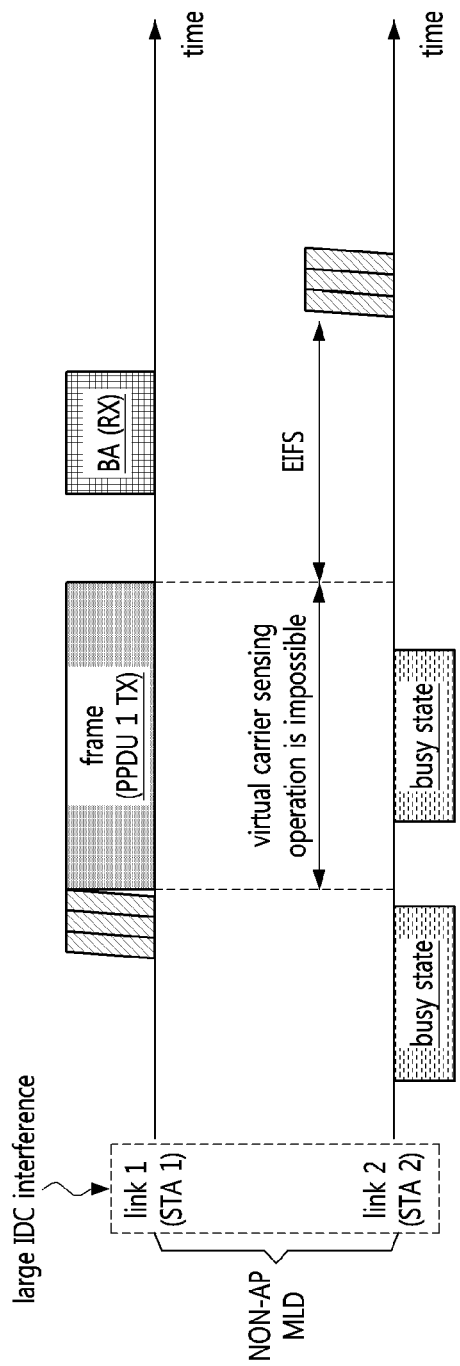
FIG. 6B is a timing diagram illustrating a fourth exemplary embodiment of a communication method using multi-links in a wireless LAN system.

FIG. 6A is a timing diagram illustrating a third exemplary embodiment of a communication method using multi-links in a wireless LAN system, and FIG. 6B is a timing diagram illustrating a fourth exemplary embodiment of a communication method using multi-links in a wireless LAN system.

Referring to FIGS. 6A and 6B, interference between adjacent channels (e.g., adjacent links) may be large. Since a transmission power of a frame transmitted in one link (e.g., link 1) causes interference while one STA performs a transmission operation (e.g., transmission operation of a PPDU 1) in the one link, a virtual carrier sensing may be impossible in the other link (e.g., link 2). As the virtual carrier sensing is not performed, a NAV (e.g., a period in which a channel through which a frame cannot be transmitted is in a busy state) may not be set. In addition, although the physical carrier sensing operation is possible, it may not be possible for the MLD to distinguish whether the transmission power is a transmission power of a frame transmitted in another link or a transmission power sensed on a frame transmitted by another STA that does not belong to the MLD.

The above-described period in which sensing is not properly performed in another link while the frame is transmitted in one link may be referred to as a blindness period. After the transmission of the frame ends in the link 1, the state of the link 2 may be classified into the state shown in FIG. 6A and the state shown in FIG. 6B. In the exemplary embodiment shown in FIG. 6A, since a frame header is not decoded and only a transmission power is detected as a result of the carrier sensing operation after the blindness period, the link state (e.g., channel state) may be determined as a busy state. In the exemplary embodiment shown in FIG. 6B, since no transmission power is detected as a result of the carrier sensing operation after the blindness period, the link state (e.g., channel state) may be determined as an idle state.

If the channel is determined to be in the idle state by the carrier sensing operation as shown in FIG. 6B, the station may perform a channel access operation after an extended interframe space (EIFS). The EIFS may be longer than a short IFS (SIFS), a point coordination function (PCF) IFS (PIFS), a distributed IFS (DIFS), and an arbitration IFS (AIFS). The EIFS may be a waiting time to protect transmission of a hidden node. The EIFS may also be referred to as a 'HiddenNodeProtect timer' or 'MediumSyncDelay timer'.

When interference between adjacent links is large, a virtual carrier sensing operation may not be performed on another link while a transmission operation is performed on one link. In this case, a PHY layer carrier sensing operation may be performed instead of the virtual carrier sensing operation. Even if it is determined that the channel of the link 2 is in a busy state at the time when the transmission operation ends in the link 1 by performing the PHY layer carrier sensing operation in the link 2 while the transmission operation is being performed in the link 1, the station may not know a channel occupancy time (e.g., channel usage time) of the link 2. In this case, the station may wait during the EIFS from the end time point of the channel busy state of the link 2. For example, the station may perform an additional channel sensing operation during the EIFS. The channel busy state (e.g., channel usage time) may mean a time during which the channel (e.g., link) is occupied by another station or access point.

When the interference between adjacent channels is very high, the channel sensing operation may be performed during the above-described EIFS. For example, when the interference caused by the transmission operation in the link 1 is large, that is, during the blindness period, a PHY layer carrier sensing operation in the link 2 may be impossible. A channel access operation may not be performed in the link in which the carrier sensing operation (e.g., PHY layer carrier sensing operation) is impossible.

Meanwhile, even in the blindness period in which the above-described channel access operation is not performed, the NAV time configured by the virtual carrier sensing operation performed before the blindness period may decrease. The normal decrease of the NAV time may mean that a successful virtual channel sensing is performed during the blindness period because the channel state is determined to be in a busy state even without performing actual carrier sensing during the set NAV period.

After the transmission operation is completed in one link (e.g., link 1), the station may perform a channel access operation for transmission of a frame in another link (e.g., link 2). When a transmission operation (e.g., transmission operation started in the blindness period) is being performed by another station in the link 2, since the station detects transmission of the frame transmitted by another station after the transmission operation is completed in one link, the station may not decode a preamble and/or MAC header transmitted in the blindness period. That is, the station may not be able to perform virtual carrier sensing in the blindness period.

Therefore, a frame decoding error may occur in the station. That is, only the channel busy state may be determined by physical carrier sensing, and the station may perform a carrier sensing operation to perform a channel access operation in the link 2 during an EIFS from an end time point of the busy state (e.g., busy state resulting from the physical carrier sensing operation) due to the frame transmission of another station. If the channel is in an idle state during the EIFS, the station may perform a backoff operation after the EIFS. When the backoff operation is completed, the station may transmit a frame in the link 2. The EIFS may be longer than a SIFS, PIFS, DIFS, and AIFS. The EIFS may be a waiting time to protect transmission of a hidden node.

Meanwhile, when frame transmission is completed in one link, a carrier sensing operation may be performed in another link. Even when the channel is determined to be in an idle state as a result of the carrier sensing operation in another link, the station may wait during an EIFS before performing a channel access operation. This is because other station(s) may occupy the channel by transmitting a frame during a time (e.g., blindness period) when the channel is not accessible by the station.

After the frame transmission is completed in the link 1, the station may identify data transmission related information (e.g., channel occupancy time or time during which the channel is in a busy state) of the link (e.g., link 2) including the period (e.g., blindness period) in which the virtual carrier sensing operation is impossible, based on data transmission related information obtained from the link 2, which is the current link, or another link (e.g., link 1 or link 3).

When the data transmission related information is a channel occupancy time, the operation of the station may be the same as the operation of setting a NAV by virtual carrier sensing when channel occupancy time information is received. The channel occupancy time information may be used as information on a time point at which the station can transmit data. Since the station can transmit data after the channel occupancy time ends in the link 2, the station may perform a channel access operation based on an AIFS instead of an EIFS, which is a normal channel access operation. The information on the channel occupancy time (e.g., channel usage time, channel busy time) for the link 2 may be received in an arbitrary link to which the independent transmission scheme cannot be applied.

Alternatively, since a link to be used has been negotiated between the access point and the station, the access point may transmit data transmission related information (e.g., channel occupancy time) for another link in the negotiated link. The link to be used may be one link among multi-links negotiated between the MLDs. In the negotiation procedure of the link to be used, the station may transmit information requesting provision of data transmission related information and information indicating the type of requested data transmission related information to the access point. The transmission of the information requesting provision of data transmission related information to the access point means that there is data to be transmitted. The data transmission related information may be information for determining a transmission possible time point based on a channel state in order to transmit data. The type of data transmission related information (e.g., frame including the data transmission related information) may be a trigger frame transmitted at a time point at which data transmission is possible or a frame informing a channel usage time and/or channel busy time to inform the time point at which data transmission is possible.

The operation of transmitting information on the channel occupancy time of another link through a used link and an operation of accessing a channel in another link may be performed as follows.

Figure 7A:
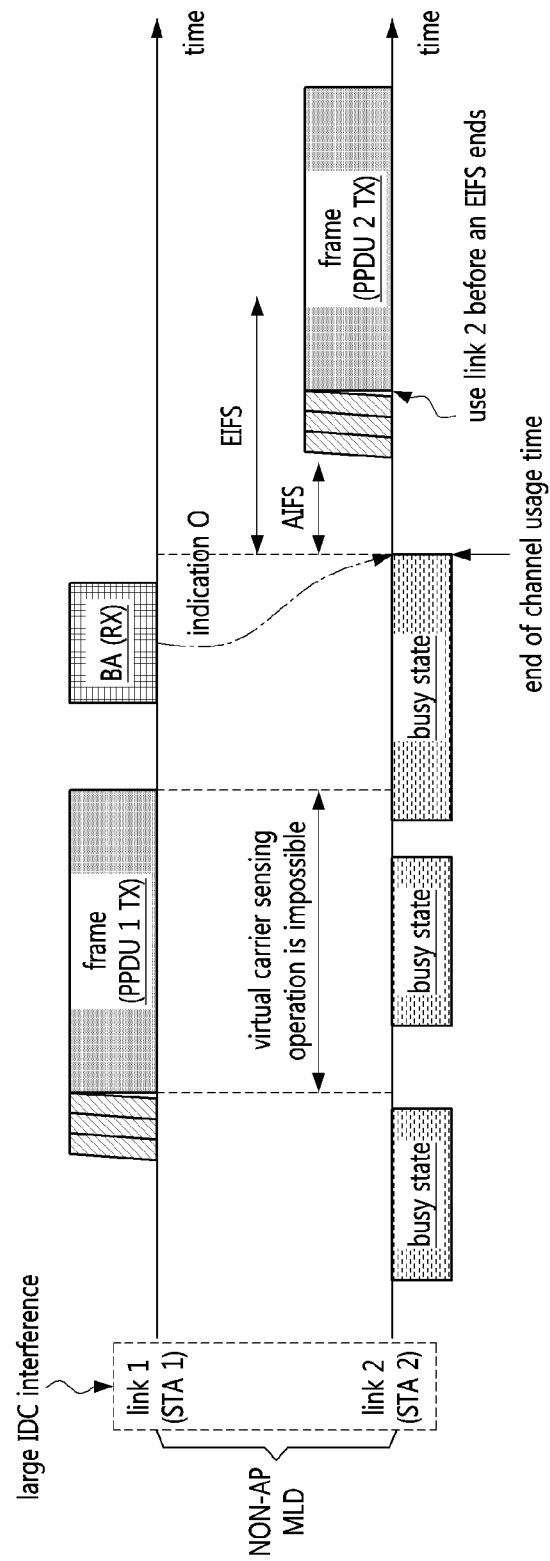
FIG. 7A is a timing diagram illustrating a fifth exemplary embodiment of a communication method using multi-links in a wireless LAN system.
Figure 7B:
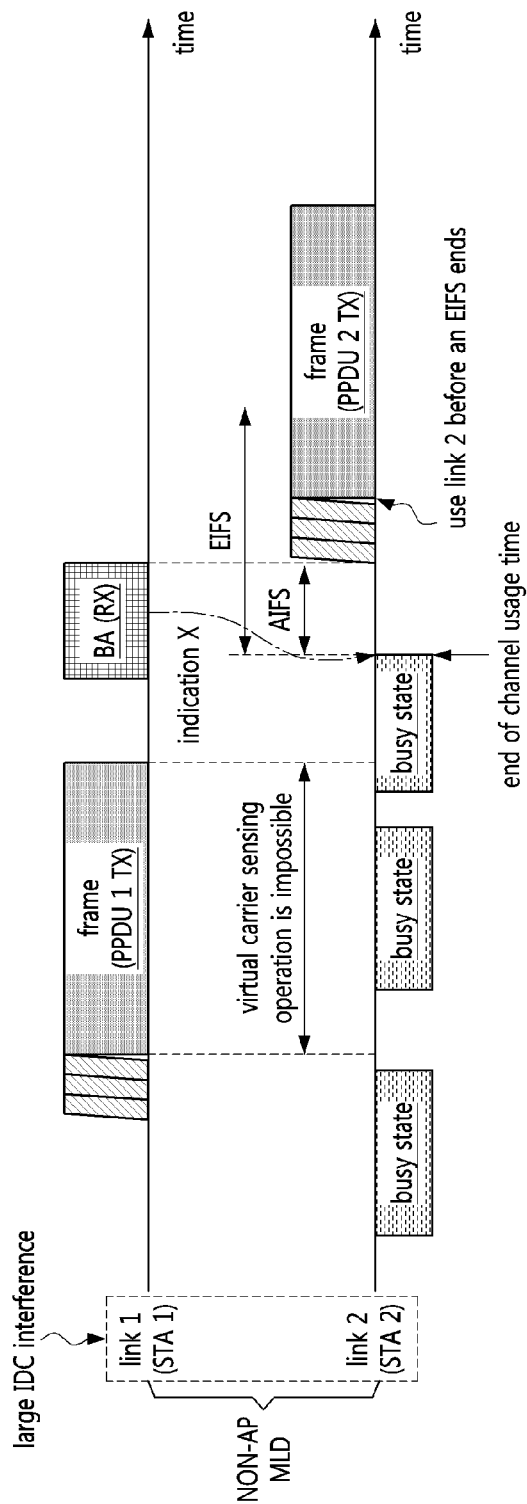
FIG. 7B is a timing diagram illustrating a sixth exemplary embodiment of a communication method using multi-links in a wireless LAN system.

FIG. 7A is a timing diagram illustrating a fifth exemplary embodiment of a communication method using multi-links in a wireless LAN system, and FIG. 7B is a timing diagram illustrating a sixth exemplary embodiment of a communication method using multi-links in a wireless LAN system.

Referring to FIGS. 7A and 7B, when interference between adjacent channels (e.g., adjacent links) is large, and a channel usage time (e.g., channel occupancy time) for another link (e.g., link 2) is identified while a transmission operation (e.g., transmission operation of a PPDU 1) is performed in one link (e.g., link 1), the station may perform a carrier sensing operation during an AIFS after the identified channel usage time. When the interference between adjacent channels is large, while a transmission operation (e.g., transmission operation of the PPDU 1) is performed in one link (e.g., link 1), a reception operation may not be performed in another link (e.g., link 2). That is, a virtual carrier sensing operation may not be performed in another link. If the channel is in an idle state during an AIFS, the station may perform a backoff operation after the AIFS. When the backoff operation is completed, the station may transmit a data frame (e.g., PPDU 2).

When the transmission operation in the link 1 and the reception operation in the link 2 cannot be performed at the same time, the station may identify information on the link (e.g., link 2) in which a virtual carrier sensing operation is not possible based on a frame received in another link (e.g., link 1), and may perform communication using the identified information. Since the negotiation on the use of multi-links between the access point and the station is completed, the station may identify whether it is impossible to perform a virtual carrier sensing operation in a link in which the independent transmission scheme cannot be used. That is, the station may identify whether simultaneous transmission and reception are impossible in all links or a specific link pair.

For example, if the use of the link 1 and the link 2 is negotiated between the access point and the station, and simultaneous transmission and reception are impossible in the link 1 and the link 2, the access point may determine that it is impossible for the station to perform a virtual carrier sensing operation in the link 2 while receiving a frame from the station in the link 1. That is, a period in which a virtual carrier sensing operation is impossible due to another link may be referred to as a blindness period. In this case, the access point may identify a value of a duration field included in a header of a frame received from another station in the link 2 by performing a virtual carrier sensing operation during the blindness period in the link 2 instead of the station. The value of the duration field may be a 'transmission time of the frame+SIFS+reception time of ACK'. Since the transmission time may be interpreted as a channel usage time, the channel usage time may be confirmed.

The access point may receive a frame (e.g., PPDU 1) from the station in the link 1, generate a block ACK (BA) frame for the received frame, and transmit the generated BA frame to the station in the link 1. The BA frame may include information on the channel usage time (e.g., the channel usage time or the NAV value identified by the virtual carrier sensing operation performed by the access point) of the link 2. The channel usage time may be the value of the duration field included in the header of the frame received through the virtual carrier sensing operation in the link 2. In exemplary embodiments, an ACK frame may be used instead of the BA frame. The BA frame or ACK frame may be a response frame for the frame (e.g., PPDU 1). When it is negotiated to use three or more links, the information on the channel usage time may be included in a frame transmitted in a third link.

The station may receive the BA frame in response to the frame (e.g., data frame) from the access point in the link 1, and may identify the information on the channel usage time in the link 2 included in the BA frame. Here, the station may set the NAV for the channel usage time indicated by the BA frame in the link 2. Since the station knows the channel usage time of the link 2, the station may perform a carrier sensing operation (e.g., channel sensing operation) during an AIFS after the channel usage time ends in the link 2. When the channel (e.g., channel in the link 2) is in an idle state during an AIFS, the station may perform a backoff operation (e.g., channel access operation) after the AIFS. When the backoff operation is completed, the station may transmit a frame (e.g., PPDU 2) in the link 2.

Alternatively, the BA frame may include information indicating that the link 2 is not used (e.g., channel usage time information set to 0). In this case, the station receiving the BA frame in the link 1 may perform a carrier sensing operation during an AIFS from the end of reception of the BA frame in the link 2. When it is determined that the channel is in an idle state by the carrier sensing operation, the station may perform a channel access operation (e.g., backoff operation) after the AIFS in the link 2. When the backoff operation is completed, the station may transmit a frame (e.g., PPDU 2) in the link 2.

On the other hand, a station may communicate with another station using multi-links. For example, a station 1 may transmit a frame (e.g., data frame) to a station 2 in the link 1. In the link 1, the station 2 may receive the frame from the station 1 and may transmit a BA frame (e.g., response frame) for the frame to the station 1. Here, the BA frame may include information indicating a channel usage time of the link 2.

That is, when the station 1 cannot perform a frame transmission operation in the link 1 and a frame reception operation in the link 2 at the same time, the station 2 receiving the data frame in the link 1 may transmit a BA frame including information of a channel usage time of a frame (e.g., frame transmitted in a blindness period) in link 2 to the station 1 in the link 1.

A separate frame may be used instead of the BA frame in order to inform the station that does not support simultaneous transmission and reception of the information on the channel usage time. The access point or station may generate a separate frame including information on a channel usage time of a specific link and may transmit the generated separate frame. The information on the channel usage time may be data transmission related information. The information on the channel usage time may refer to information on a time point at which the station can transmit data in the link 2 after the blindness period. The frame including the information on the time point may be a trigger frame transmitted at a transmission possible time point or a frame indicating the channel usage time or channel busy time. This operation may be performed as follows.

Figure 8:
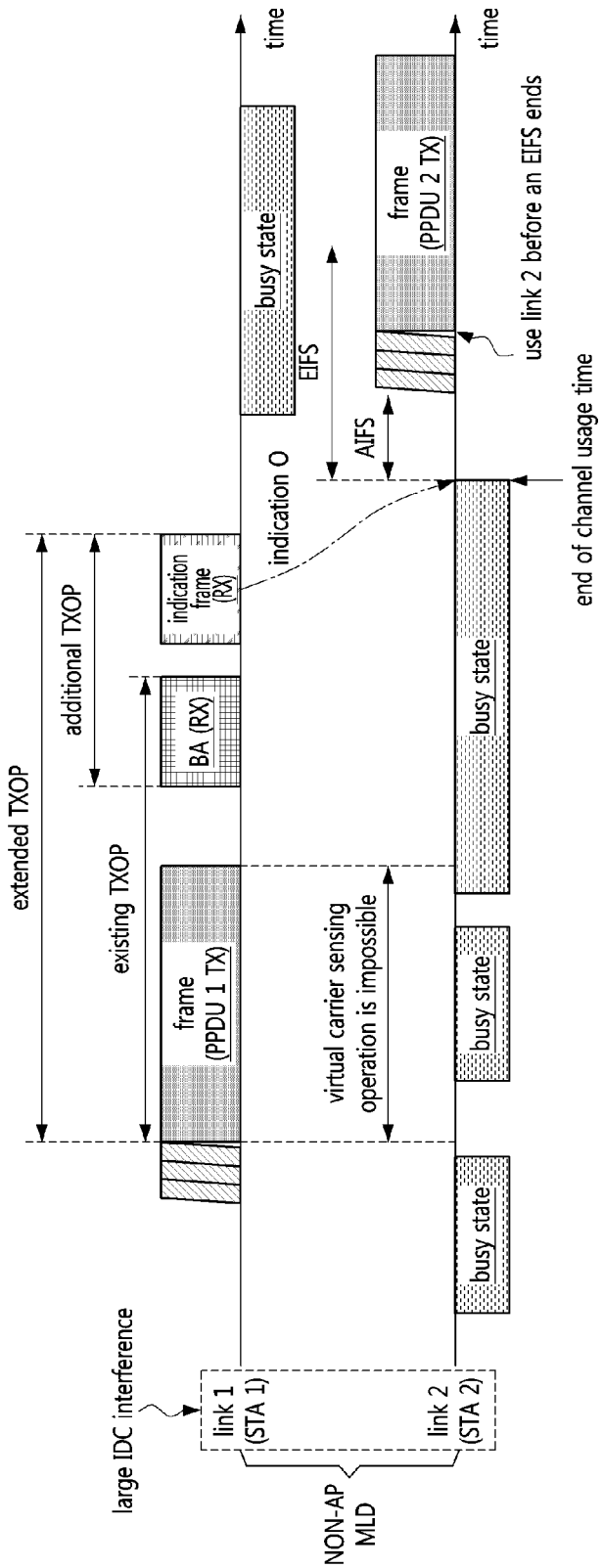
FIG. 8 is a timing diagram illustrating a seventh exemplary embodiment of a communication method using multi-links in a wireless LAN system.

FIG. 8 is a timing diagram illustrating a seventh exemplary embodiment of a communication method using multi-links in a wireless LAN system.

Referring to FIG. 8, when interference between adjacent channels (e.g., adjacent links) is large, and information on a channel usage time (e.g., channel occupancy time) of another link (e.g., link 2) is obtained while a transmission operation (e.g., transmission operation of a PPDU 1) is performed in one link (e.g., link 1), the station may perform a carrier sensing operation (e.g., channel sensing operation) in the link 2 during an AIFS after the channel usage time ends. When the interference between adjacent channels is large, the transmission operation in another link (e.g., link 2) cannot be performed while the transmission operation (e.g., transmission operation of a PPDU 1) is performed in one link (e.g., link 1). That is, the virtual carrier sensing operation may not be performed in another link. If the channel is in an idle state during an AIFS, the station may perform a backoff operation after the AIFS. When the backoff operation is completed, the station may transmit a data frame (e.g., PPDU 2) in the link 2.

When the transmission operation in the link 1 and the reception operation in the link 2 cannot be performed at the same time, the station may identify information on the link (e.g., link 2) in which the virtual carrier sensing operation is impossible through a frame received in another link (e.g., link 1), and perform communication using the identified information. For example, if the use of the link 1 and the link 2 is negotiated between the access point and the station, and simultaneous transmission and reception in the link 1 and the link 2 are not possible, since the station does not support the independent transmission scheme (i.e., the station does not support simultaneous transmission and reception), the access point may determine that there is a blindness period in which the virtual carrier sensing operation of the corresponding station cannot be performed in the link 2 while transmission is performed in the link 1.

When a station 1 perform a transmission operation of a frame (e.g., PPDU 1) in the link 1, and a station 2 (or access point) receiving the frame knows information of the link used by the station 1, the station 2 (or access point) may inform the station 1 of information on the link occupied (e.g., information on a channel usage time of the link 2) in the blindness period in which the virtual carrier sensing operation is not possible while transmitting the frame (e.g., PPDU 1) in the link 1. For example, if the use of the link 1 and the link 2 is negotiated between the access point and the station, and simultaneous transmission and reception in the link 1 and the link 2 are not possible, the access point may know that the station cannot perform the virtual sensing operation in the link 2 while transmitting the frame in the link 1.

In this case, the access point (or another station) may identify the channel usage time (e.g., channel occupancy time) by performing the virtual carrier sensing operation in the link 2 during the blindness period in which the station cannot perform the virtual carrier sensing, and transmit information on the channel usage time of the link 2 to the station in the link 1. The virtual carrier sensing operation in the link 2 may be performed by the access point (or another station) instead of the station.

Therefore, the access point may transmit to the station an arbitrary frame (hereinafter, 'indication frame') including the information on the channel usage time (e.g., channel usage time or NAV value identified by the virtual carrier sensing operation of the access point) of the link 2 in the link 1 after transmitting a BA frame (e.g., response frame) for the frame (e.g., PPDU 1) received from the station to the station. The indication frame may be transmitted after a specific time (e.g., short interframe space (SIFS) or point coordination function (PCF) interframe space (PIFS)) from the transmission end time point of the BA frame. The information on the channel usage time of the link 2 may be a Clear To Send (CTS) frame (e.g., EHT (E)-CTS frame), a separate frame including an EHT control field, or a trigger frame. The CTS frame, separate frame, or trigger frame may be used as the indication frame On the other hand, when the station 1 that does not support the simultaneous transmission/reception scheme transmits a frame in the link 1 among the multi-links, a 'transmission time of the BA frame for the corresponding frame+specific time (e.g., SIFS or PIFS)+transmission time of the indication frame' may be set as an additional TXOP. That is, an existing TXOP for transmission of the data frame (e.g., PPDU 1) may be extended to an extended TXOP in consideration of the above-described additional TXOP. The extended TXOP may be set by the station 1, the station 2, and/or the access point. The TXOP may be set as a duration field value included in a header of the transmitted frame.

For example, the station 1 may configure an extended TXOP, and may inform the station 2 or the access point of information on the extended TXOP. The information on the extended TXOP may be included in a data frame (e.g., PPDU 1) associated with the extended TXOP. The station 2 or the access point may identify the information on the extended TXOP by receiving the data frame from the station 1. When it is confirmed that the existing TXOP has been extended, the station 2 or the access point may determine that transmission of an indication frame is requested. The indication frame may be data transmission related information. Therefore, that the station 1 requests the transmission of the indication frame may mean that the station 1 wants to transmit additional data existing in a buffer other than the data frame transmitted in the link 1. If additional data other than the frame transmitted in the link 1 does not exist in the buffer of the station 1, the indication frame may not be requested. This operation may mean that the TXOP is not extended, and the indication frame may not be requested.

Whether the extended TXOP has been configured or not may be identified based on a value of a length field included in a preamble of the data frame (e.g., PPDU 1) and a value of a duration field included in a MAC header. When the value of the duration field included in the MAC header>(the value of the length field included in the preamble+SIFS+transmission time of the BA frame), the station 2 or the access point may determine that the station 1 has requested the transmission of the indication frame. That is, the station 2 or the access point may determine that the extended TXOP has been configured by the station 1.

When it is confirmed that the extended TXOP has been configured based on the information included in the data frame, the station 2 or the access point may transmit the indication frame to the station 1 after transmitting the BA frame for the corresponding data frame. Alternatively, when the link 2 is in an idle state, the station 2 or the access point may omit the transmission of the indication frame. Information indicating whether the indication frame is transmitted may be included in a 'More Data' field of a MAC header of the BA frame. A bit in the 'More Data' field may indicate whether a frame (e.g., packet) to be additionally transmitted after transmission of the current frame exists. When the bit of the 'More Data' field included in the BA frame is set to a first value, this may indicate that the indication frame is transmitted after the transmission of the BA frame. When the bit of the 'More Data' field included in the BA frame is set to a second value, this may indicate that the indication frame is not transmitted after the transmission of the BA frame. The bit (e.g., 'More Data' bit) set to the second value may indicate that the link 2 is in an idle state. Alternatively, it may be indicated that the transmission of the indication frame is omitted by setting the value of the duration field included in the MAC header of the BA frame to only the transmission time of the current BA frame.

The station 1 may receive the BA frame for the data frame, and may identify the value of the 'More Data' field (e.g., 'More Data' bit) and/or the value of the duration field included in the BA frame. When the bit of the 'More Data' field is set to the first value or when the value of the duration field is set to an end time of the extended TXOP, the station 1 may perform a reception operation of the indication frame. On the other hand, when the bit of the 'More Data' field is set to the second value or when the value of the duration field is set to only the transmission time of the current BA frame, the station 1 may not perform the reception operation of the indication frame. In this case, the station 1 may determine that the link 2 is in an idle state.

In another exemplary embodiment, the existing TXOP may be configured by the station 1, and the additional TXOP may be configured by the station 2 or the access point. For example, the station 2 or the access point may receive the data frame (e.g., PPDU 1) from the station 1, and may generate a BA frame for the data frame. When an indication frame is transmitted, the value of the duration field included in the MAC header of the BA frame may be set in consideration of a transmission time of the indication frame. The value of the duration field included in the BA frame may be set to (transmission time of the BA frame+specific time (e.g., SIFS or PIFS)+transmission time of the indication frame). The station 2 or the access point may transmit the BA frame including the duration field indicating the additional TXOP to the station 1 in the link 1.

The station 1 may receive the BA frame and may identify the value of the duration field included in the MAC header of the BA frame. When the value of the duration field indicates the extended TXOP, the station 1 may perform a reception operation of the indication frame. On the other hand, when the value of the duration field does not indicate the extended TXOP, the station 1 may not perform the reception operation of the indication frame. According to the above-described operation, it is possible to prevent other stations from transmitting frames according to channel contention procedures in the additional TXOP.

Upon receiving the indication frame, the station 1 may perform a carrier sensing operation in the link 2 during an AIFS from the end time point of the channel usage time indicated by the indication frame. Here, the station 1 may set a NAV according to the channel usage time in the link 2. When the channel is idle during the AIFS, the station 1 may perform a backoff operation in the link 2 after the AIFS. When the backoff operation is completed, the station 1 may transmit a data frame (e.g., PPDU 2) in the link 2.

When the indication frame indicates that the link 2 is in an idle state (e.g., when the channel usage time is set to 0 or when the indication frame is indicated not to be transmitted), if the channel is in an idle state during an AIFS from a reception time point (e.g., reception end point) of the indication frame, the station 1 may perform a backoff operation in the link 2. That is, since an end time of a frame detected by a carrier sensing operation after the blindness period in the link 2 can be identified by the received indication frame, a normal channel access procedure may be performed from the reception end point indicated by the indication frame. When the backoff operation is completed, the station 1 may transmit a data frame (e.g., PPDU 2) in the link 2. Alternatively, when the transmission of the indication frame is omitted and that the indication frame is not transmitted means the idle state, if the channel is in an idle state during an AIFS from a reception time point (e.g., reception end point) of the BA frame, the station 1 may perform a backoff operation in the link 2. That is, when the idle state is determined in the link 2 by the carrier sensing operation after the blindness period, it may be determined as an actual idle state in which no hidden node exists. In this case, the normal channel access procedure may be performed after the blindness period. When the backoff operation is completed, the station 1 may transmit a data frame (e.g., PPDU 2) in the link 2.

Figure 9A:
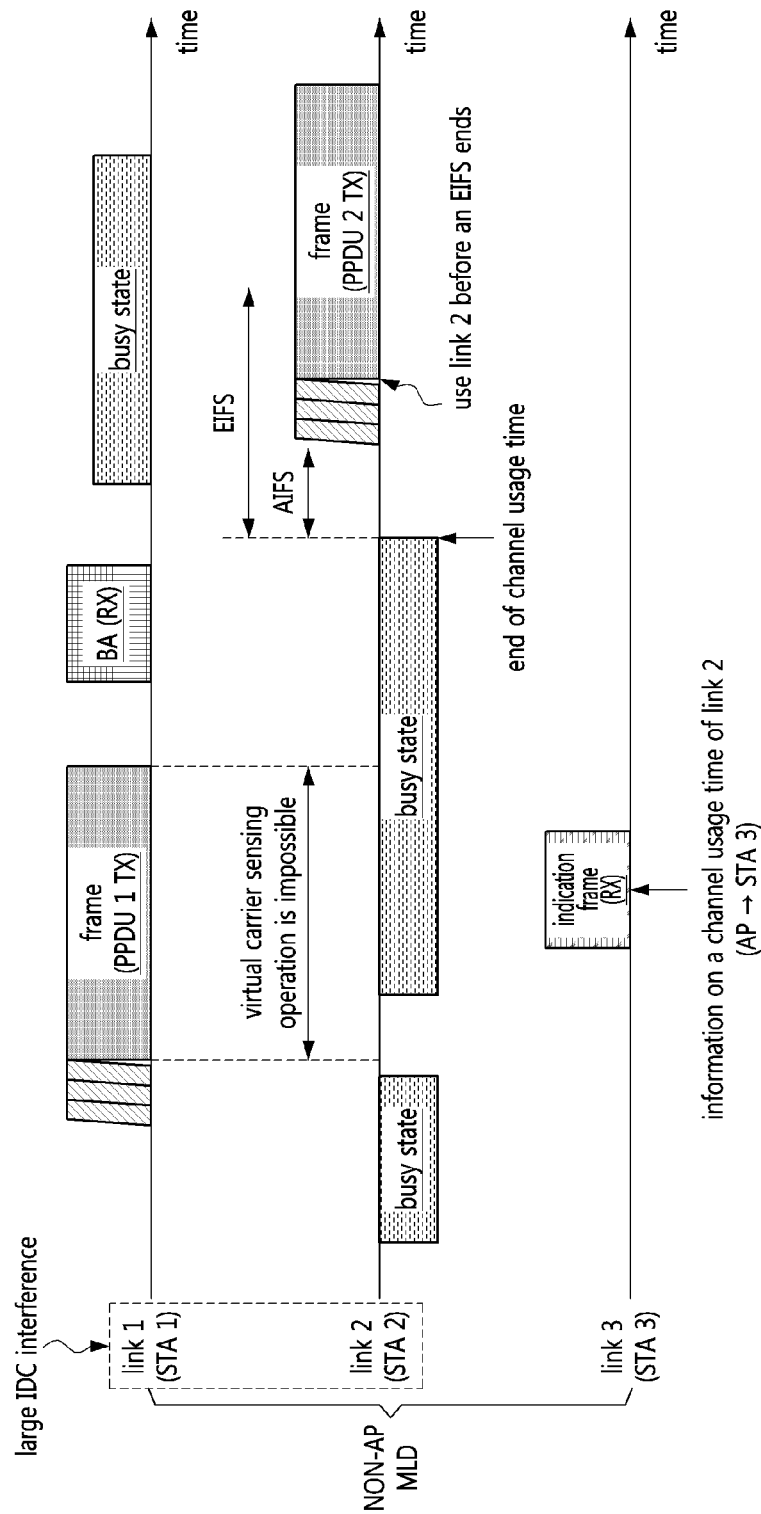
FIG. 9A is a timing diagram illustrating an eighth exemplary embodiment of a communication method using multi-links in a wireless LAN system.
Figure 9B:
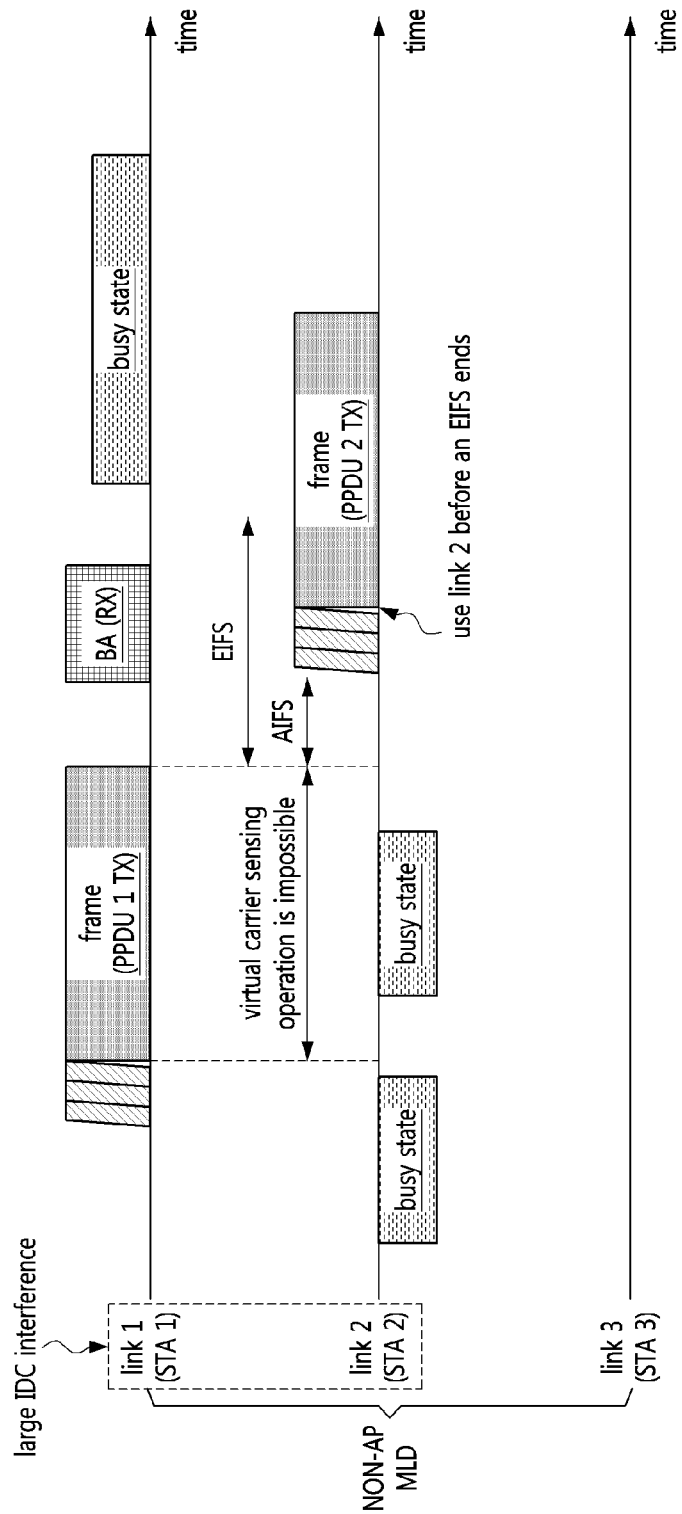
FIG. 9B is a timing diagram illustrating a ninth exemplary embodiment of a communication method using multi-links in a wireless LAN system.

FIG. 9A is a timing diagram illustrating an eighth exemplary embodiment of a communication method using multi-links in a wireless LAN system, and FIG. 9B is a timing diagram illustrating a ninth exemplary embodiment of a communication method using multi-links in a wireless LAN system.

Referring to FIGS. 9A and 9B, when interference between adjacent channels (e.g., adjacent links) is large, and information on a channel usage time (e.g., channel occupancy time) for another link (e.g., link 2) is obtained in a blindness period while a transmission operation (e.g., transmission operation of a PPDU 1) is performed in one link (e.g., link 1), the station may perform a normal channel access operation after the channel usage time ends. That is, the station may perform a carrier sensing operation during an AIFS.

When interference between adjacent channels is large, while a transmission operation (e.g., transmission operation of a PPDU 1) is performed in one link (e.g., link 1), a reception operation may not be performed in another link (e.g., link 2). That is, a virtual carrier sensing operation may not be performed in another link. If the channel is in an idle state during an AIFS, the station may perform a backoff operation after the AIFS. When the backoff operation is completed, the station may transmit a data frame (e.g., PPDU 2).

The use of the link 1, link 2, and link 3 may be negotiated in a negotiation procedure for multi-link operations between the access point and the station. In this case, the access point may transmit a separate frame (hereinafter referred to as 'indication frame') including information on the channel usage time of the link 2 to the station in the link 3. For example, the station may not support the simultaneous transmission/reception scheme in the link 1 and the link 2. That is, the link 1 and link 2 may be a link pair in which simultaneous transmission and reception are not possible. In this case, the access point may know that there is a blindness period in which the station cannot simultaneously perform a transmission operation in the link 1 and a carrier sensing operation in the link 2. Accordingly, the access point may identify the channel usage time (e.g., channel occupancy time) by performing a virtual carrier sensing operation in the link 2 during the blindness period. The access point may transmit an indication frame including information on the channel usage time of the link 2 (e.g., channel usage time or NAV identified by the virtual carrier sensing operation of the access point) in the link 3. The indication frame may be a CTS frame (e.g., E-CTS frame), a separate frame including an EHT control field, or a trigger frame.

Since the link 1 and the link 3 are not a link pair in which simultaneous transmission and reception are impossible, the station may receive the indication frame in the link 3 while performing a transmission operation in the link 1. The station may identify the channel usage time of the link 2 indicated by the indication frame. The station may set a NAV in the link 2 by using the channel usage time. The station may perform normal channel access in the link 2 from the channel usage time ends, that is, from the end of the NAV. The station may perform a carrier sensing operation during an AIFS from the end of the NAV, and may perform a channel access operation (e.g., backoff operation) after the AIFS when the channel is in an idle state during the AIFS. When the backoff operation is completed, the station may transmit a data frame (e.g., PPDU 2) in the link 2.

On the other hand, when the channel of the link 2 is in a busy state while the station performs a transmission operation (e.g., during a blindness period), and an end point of the busy state of the link 2 is after a transmission end point of a data frame (e.g., PPDU 1) in the link 1, the access point may necessarily use the link 3 to inform the end time point of the channel usage time (e.g., end time point information of the busy state) for the link 2. When the above operation is negotiated between the access point and the station, the channel of the link 3 is in an idle state at the transmission end point of the link 1, and the information on the channel usage time for the link 2 is not received from the access point, the station may determine that the channel of the link 2 is in an idle state. Accordingly, the station may perform a carrier sensing operation in the link 2 during an AIFS from the transmission end point of the link 1 (e.g., after the blindness period). When the channel is in an idle state during the AIFS, the station may perform a channel access operation (e.g., backoff operation) after the AIFS. When the backoff operation is completed, the station may transmit a data frame (e.g., PPDU 2) in the link 2.

Meanwhile, when a station that does not support the simultaneous transmission/reception scheme in multi-links obtains information on a channel usage time of another link, the station may perform a simultaneous transmission operation in the multi-links based on the following procedure.

Figure 10A:
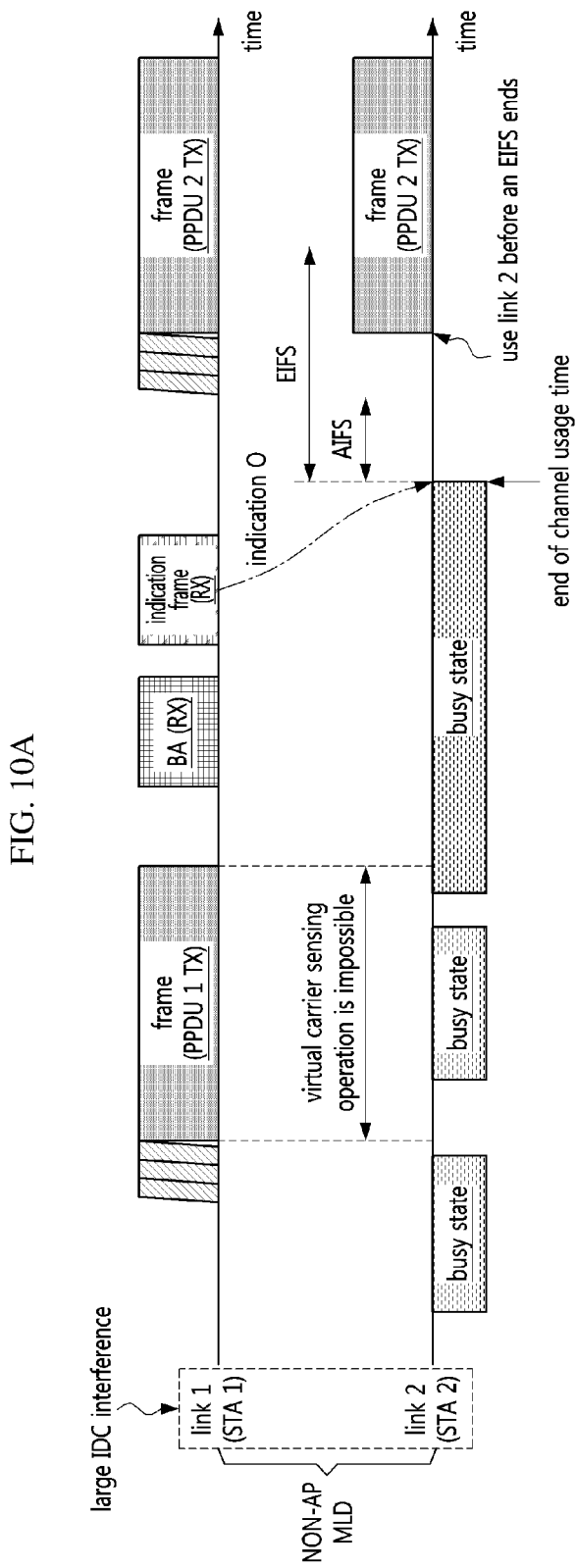
FIG. 10A is a timing diagram illustrating a tenth exemplary embodiment of a communication method using multi-links in a wireless LAN system.
Figure 10B:
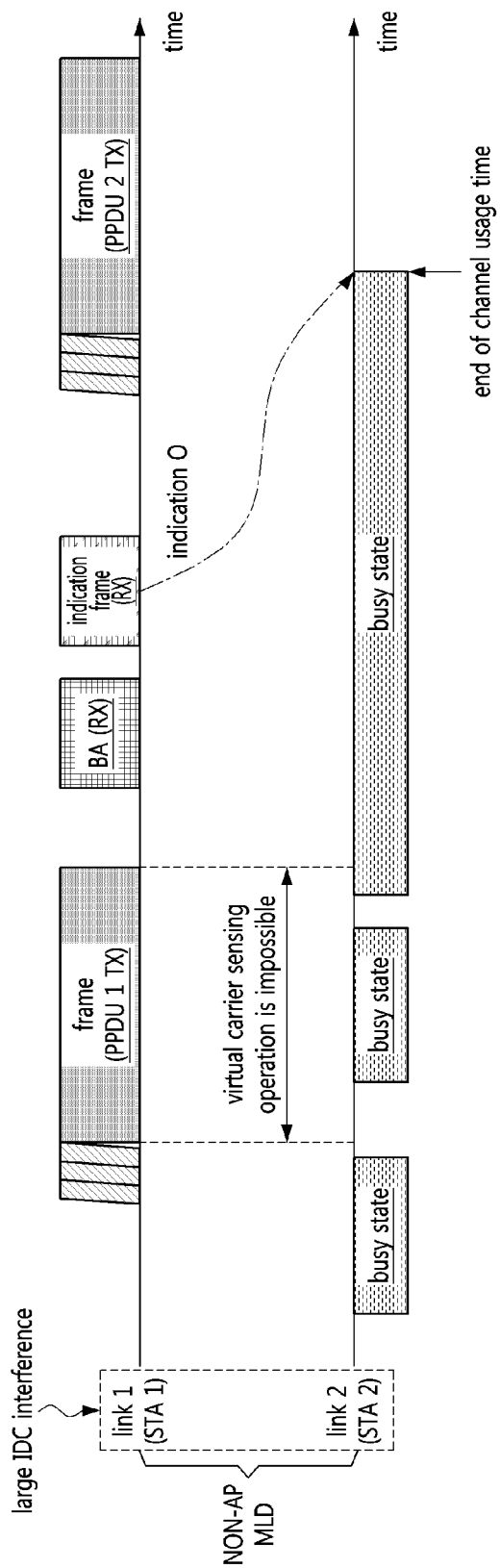
FIG. 10B is a timing diagram illustrating an eleventh exemplary embodiment of a communication method using multi-links in a wireless LAN system.

FIG. 10A is a timing diagram illustrating a tenth exemplary embodiment of a communication method using multi-links in a wireless LAN system, and FIG. 10B is a timing diagram illustrating an eleventh exemplary embodiment of a communication method using multi-links in a wireless LAN system.

Referring to FIGS. 10A and 10B, when interference between adjacent channels (e.g., adjacent links) is large, and information on a channel usage time of another link (e.g., link 2) is obtained while a transmission operation (e.g., transmission operation of a PPDU 1) is performed in one link (e.g., link 1), the simultaneous transmission operation may be performed based on the channel usage time. When interference between adjacent channels is large, while a transmission operation (e.g., transmission operation of PPDU 1) is performed in one link (e.g., link 1), a reception operation may not be performed in another link (e.g., link 2). That is, a virtual carrier sensing operation may not be performed in another link. A station 1 may receive an indication frame (e.g., CTS frame) including the information on the channel usage time of the link 2 in the link 1. The station 1, which cannot support the simultaneous transmission/reception scheme in multi-links, may perform a simultaneous transmission operation in the multi-links (e.g., link 1 and link 2) based on the channel usage time indicated by the indication frame.

For example, when the station 1 does not support the simultaneous transmission/reception scheme in the link 1 and the link 2, and transmits a frame (e.g., PPDU 1) in the link 1, the access point or station 2 may inform the information on the channel usage time of the link 2 to the station 1 based on the methods described in FIGS. 7A 7B, 8, 9A, and/or 9B. In this case, the station 1 may identify the information on the channel usage time of the link 2, and determine that the channel of the link 2 is busy until the end of the channel usage time.

When the transmission operation ends in the link 1, the station 1 may perform a channel access operation to transmit another frame (e.g., PPDU 2). In this case, if the channel of the link 2 is determined to be in an idle state, the station 1 may perform a simultaneous transmission operation using the link 1 and the link 2. If the transmission operation is desired to be extended to the link 1 and the link 2 (e.g., when simultaneous transmission is to be performed using both the link 1 and the link 2), if the channel of the link 2 is in an idle state during a 'T1~T2', the station 1 may transmit frames (e.g., PPDU 2) by simultaneously using the link 1 and link 2 regardless of the EIFS. The length of 'T1~T2' may be a PIFS, AIFS, or execution time of a channel access operation for transmission of the PPDU 2 in the link 1. T2 may be a start time point or end time point of a channel access operation for transmission of the PPDU 2 in the link 1. T1 may be a length of 'T2−(length of 'T1~T2').

On the other hand, when the end point of the channel usage time indicated by the methods shown in FIGS. 7A, 7B, 8, 9A, and/or 9B described above is after T1, the station 1 may use only the link 1 to transmit a data frame (e.g., PPDU 2).

Figure 11:
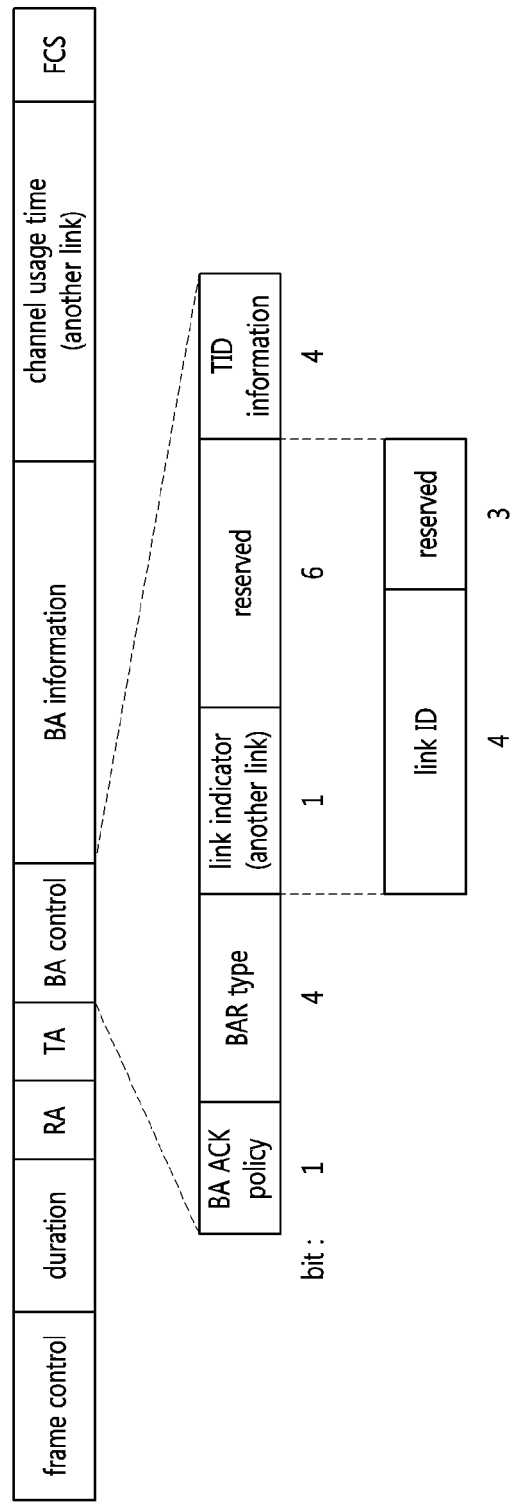
FIG. 11 is a block diagram illustrating a first exemplary embodiment of a BA frame including channel usage time information in a wireless LAN system.

FIG. 11 is a block diagram illustrating a first exemplary embodiment of a BA frame including channel usage time information in a wireless LAN system.

Referring to FIG. 11, a BA frame (e.g., BA frame shown in FIG. 7A and/or FIG. 7B) may include information on a channel usage time of a specific link, an identifier (e.g., link ID) of a link to which the channel usage time information is applied, and/or information indicating that the channel usage time information is included in the corresponding BA frame. The information indicating that channel usage time information is included in the BA frame may be configured as follows.

Scheme 1: By adding a value of 1 to 8 μs to a duration field of the BA frame, it may be indicated that the channel usage time information is included in the BA frame.

Scheme 2: A BA control field of the BA frame may include information indicating that the channel usage time information is included in the BA frame and/or a link ID indicating a link related to the channel usage time information (e.g., link to which the channel usage time information is applied).

When Scheme 1 is used, the value added to the duration field may be a link ID indicating a link related to the channel usage time information. Alternatively, if the BA frame does not indicate a link related to the channel usage time information, the link related to the channel usage time information may be a link not capable of simultaneous transmissions, which is recognized by the communication node (e.g., station or access point) transmitting and receiving the corresponding BA frame.

When the information included in the BA frame indicates that the channel usage time information is included in the corresponding BA frame, the communication node may generate a BA frame further including a field indicating the channel usage time information. The channel usage time indicated by the BA frame may start from a transmission time point (e.g., transmission start point or transmission end point) of the corresponding BA frame. The channel usage time may be set in units of μs. That is, the channel usage time may indicate a period (e.g., duration) in which the channel is used. Alternatively, the channel usage time information included in the BA frame may indicate the end time point of the channel usage time.

Meanwhile, the BA frame including the channel usage time information may have a form of an existing BA frame. The duration field of the BA frame may be used to indicate the remaining channel usage time (e.g., remaining channel occupancy time) of another link. For example, in the duration field, bits 14 and 15 may be set to '1', and the remaining bits may be set to indicate a value between 8192 and 16383. In this case, the remaining channel usage time of another link may be expressed as 'value indicated by bits 0 to 13 in the duration field−8191)×4 μs'. For example, if a value indicated by bits 0 to 13 in the duration field is 8192, the remaining channel usage time may be 4 μs from the transmission time point of the BA frame. When the value indicated by bits 0 to 13 in the duration field is 16383, the remaining channel usage time may be 32768 μs from the transmission time point of the BA frame.

When the BA frame for the data frame is received, the station may analyze the duration field included in the BA frame based on the above-described schemes to identify the channel usage time (e.g., the remaining channel usage time) of the link in which a carrier sensing operation is impossible. That is, the station may determine that the channel (e.g., link) is busy during the channel usage time indicated by the BA frame. When the BA control field of the BA frame includes a link ID indicating a link related to the channel usage time, the station may determine that the channel is in a busy state in the link indicated by the BA control field during the channel usage time identified based on the duration field.

In another exemplary embodiment, in order to indicate the channel usage time (e.g., remaining channel usage time) of another link, a value smaller than the length of one slot (e.g., 9 μs) may be used. For example, when the length of one slot is 9 μs, the channel usage time may be indicated using 1 to 8. When the maximum transmission possible time or the negotiated transmission possible time for one PPDU is $T_{tx}$, a value of a time corresponding to $T_{tx}/8$ may be indicated. For example, when $T_{tx}$ is 100 μs, $T_{tx}/8$ may be 12.5. When the channel usage time (e.g., remaining channel usage time) is 5 μs, the value of the duration field may be set to 'transmission time of the frame (e.g., the value of the existing duration field)+1'. When the channel usage time (e.g., the remaining channel usage time) is 26 μs, the value of the duration field may be set to 'transmission time of the frame (e.g., the value of the existing duration field)+3'.

When the BA frame for the data frame is received, the station may identify the channel usage time (e.g., the remaining channel usage time) by interpreting the value of the duration field included in the BA frame based on the above-described schemes. When the channel usage time ends, the station may determine that the channel (e.g., link) is in an idle state, and may perform a channel access operation in the corresponding channel.

In another exemplary embodiment, the duration field of the BA frame may indicate a time for which the station additionally waits (e.g., a time for which an additional carrier sensing operation is performed) after the channel is determined to be in an idle state by a channel access operation (e.g., backoff operation). If the BA frame does not indicate the above-described additional waiting time, since the station performs a channel access operation after waiting for an EIFS after the end of the busy state, it is preferable to set $T_{tx}$ to a more advantageous value compared to an EIFS to reduce unnecessary waiting time. For example, $T_{tx}$ may be set as '$T_{tx}$=EIFS', and a value calculated by the above-described scheme may be added to the duration field of the BA frame.

When the above-described method is used, the time for which the channel state is determined may be longer than AIFS and shorter than EIFS. When the BA frame for the data frame is received, the station may identify the time by interpreting a remainder obtained by dividing the value of the duration field included in the BA frame by 9, and may additionally wait for the identifier time from the time point at which the channel is determined to be idle. When the channel is in an idle state during the identified time (e.g., waiting time), the station may perform a channel access operation (e.g., backoff operation).

The indication frame shown in FIGS. 8, 9A, 9B, 10A, and/or 10B may be configured identically or similarly to the above-described BA frame. For example, the indication frame may include channel usage time information of a specific link, an ID of a link to which the channel usage time information is applied and/or information indicating that the channel usage time information is included in the corresponding indication frame.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a station (STA) multi-link device (MLD) supporting multi-link in a communication system, comprising:
  transmitting, by a first STA affiliated with the STA MLD, a first frame using a first link among the multi-link;
  in response to the STA MLD not supporting simultaneous transmit and receive (STR) operations, performing, by a second STA affiliated with the STA MLD, a carrier sensing operation in a first time period according to a first timer after a blindness period on a second link among the multi-link; and
  performing, by the second STA affiliated with the STA MLD, an operation for a transmission after the first time period on the second link,
  wherein the blindness period occurs on the second link due to transmission of the first frame on the first link, and the blindness period is a period in which the carrier sensing operation is impossible.

2. The operation method according to claim 1, wherein the operation for the transmission is a backoff operation.

3. The operation method according to claim 1, wherein a virtual carrier sensing operation by a frame transmitted by an access point (AP) MLD is not performed on the second link during the transmission of the first frame.

4. The operation method according to claim 3, wherein the virtual carrier sensing operation is an operation for configuring a network allocation vector (NAV) which is a time period in which the STA MLD does not transmit.

5. The operation method according to claim 1, wherein the first time period is longer than a short interframe space (SIFS), a point coordination function (PCF) interframe space (PIFS), a distributed interframe space (DIFS), or an arbitration interframe space (AIFS).

6. The operation method according to claim 1, further comprising:
  receiving a second frame indicating a transmission time on the second link through one link among the multi-link from an AP MLD,
  wherein the transmission time indicates a time in which a transmission on the second link is possible.

7. The operation method according to claim 6, further comprising:
  transmitting, by the second STA affiliated with the STA MLD, a third frame in the time indicated by the transmission time using the second link.

8. The operation method according to claim 6, further comprising:
  transmitting an indicator requesting a transmission of the second frame to the AP MLD.

9. The operation method according to claim 6, wherein a transmission of the second frame is based on an indicator requesting the transmission of the second frame to the AP MLD.

10. A station (STA) multi-link device (MLD) supporting multi-link in a communication system, comprising:
  a processor,
  wherein the processor causes the STA MLD to:
  transmit, by a first STA affiliated with the STA MLD, a first frame using a first link among the multi-link;
  in response to the STA MLD not supporting simultaneous transmit and receive (STR) operations, perform, by a second STA affiliated with the STA MLD, a carrier sensing operation in a first time period according to a first timer after a blindness period on a second link among the multi-link; and
  perform, by the second STA affiliated with the STA MLD, an operation for a transmission after the first time period on the second link,
  wherein the blindness period occurs on the second link due to transmission of the first frame on the first link, and the blindness period is a period in which the carrier sensing operation is impossible.

11. The STA MLD according to claim 10, wherein the operation for the transmission is a backoff operation.

12. The STA MLD according to claim 10, wherein a virtual carrier sensing operation by a frame transmitted by an access point (AP) MLD is not performed on the second link during the transmission of the first frame.

13. The STA MLD according to claim 12, wherein the virtual carrier sensing operation is an operation for configuring a network allocation vector (NAV) which is a time period in which the STA MLD does not transmit.

14. The STA MLD according to claim 10, wherein the first time period is longer than a short interframe space (SIFS), a point coordination function (PCF) interframe space (PIFS), a distributed interframe space (DIFS), or an arbitration interframe space (AIFS).

15. The STA MLD according to claim 10, wherein the processor further causes the STA MLD to:
  receive a second frame indicating a transmission time on the second link through one link among the multi-link from an AP MLD,
  wherein the transmission time indicates a time in which a transmission on the second link is possible.

16. The STA MLD according to claim 15, wherein the processor further causes the STA MLD to:
  transmit, by the second STA affiliated with the STA MLD, a third frame in the time indicated by the transmission time using the second link.

17. The STA MLD according to claim 15, wherein the processor further causes the STA MLD to:
  transmit an indicator requesting a transmission of the second frame to the AP MLD.

18. The STA MLD according to claim 15, wherein a transmission of the second frame is based on an indicator requesting the transmission of the second frame to the AP MLD.

* * * * *